UNITED STATES PATENT OFFICE.

WILHELM PETSCHEL, OF BERLIN, GERMANY.

METHOD OF MAKING SECONDARY OR STORAGE BATTERY PLATES.

SPECIFICATION forming part of Letters Patent No. 566,531, dated August 25, 1896.

Application filed January 13, 1896. Serial No. 575,368. (No specimens.) Patented in Belgium November 6, 1895, No. 118,198.

*To all whom it may concern:*

Be it known that I, WILHELM PETSCHEL, electrical engineer, a subject of the German Emperor, residing at Berlin, Germany, have invented an Improved Method of Making Secondary or Storage Battery Plates, (for which Letters Patent have been obtained in Belgium, No. 118,198, dated November 6, 1895,) of which the following is a specification.

My invention consists of an improved method of making secondary or storage battery plates. Secondary or storage battery plates, as used hitherto, wherein the active material consists of oxid of lead, necessitate, as a rule, the employment of a solid lead core to act as a support for such material. Now it is a well-known fact (although the nature of the chemical processes which cause it be not yet perfectly well ascertained) that this active material is liable to destruction when in use, so that, generally speaking, the plates prove comparatively short lived, and more particularly so in those cases where the storage battery is subjected to concussion or vibration. Besides, the plates always take some time to "form" under the action of the electric current.

By my present invention I secure the two advantages that, first, the lead core or support usually employed can be dispensed with, and, secondly, the duration of the "forming" stage under the action of the electric current is reduced to a comparatively short time. The method of manufacture which this invention embodies is, in fact, a purely chemical one, and the battery-plate obtained thereby is proof against chemical and mechanical influences. Plates constructed according to this invention may therefore be utilized in a storage battery directly and without any preparatory manipulation, and they will prove superior to any preëxisting battery-plates in regard to durability, lightness, and useful effect.

According to this invention oxid of lead is mixed with sulfate of zinc into a paste, which, on being allowed to dry, solidifies. In doing so the sulfate of zinc brought into the presence of the liberal quantities of oxid of lead, which the mass contains, undergoes with the same a process of reaction, with the result that there form certain compounds insoluble in water, viz., sulfate of lead and hydrated oxid of zinc, the latter compound, in its turn, readily combining with oxid of lead into plumbo-zinc oxid. Now it is well known that hydroxid of zinc is of a nature not unlike jelly or paste, and forms an easily-moldable semi-liquid substance capable of being spread over surfaces with ease, in which the hydroxid of zinc itself acts as a binding medium similar to mastic or putty. After drying the battery-plates, over which such a mass has been spread, (a portion of the water which had been fixed in the hydroxid of zinc or in the plumbo-zinc oxid escaping during the drying process,) the said plates will be found rigid and capable of resisting with comparatively great efficacy any mechanical influence to which they may be subjected. If the plates be now placed in dilute acid, (preferably nitric acid or sulfuric acid,) oxid of zinc will separate in the solution, so that the mass of material, which the presence of sulfate of zinc has hardened already, will, in addition to this, become porous. By such means both positive and negative plates may be manufactured.

In order to further illustrate the invention, one way of carrying it into practical effect may here be stated by way of example, as follows: In making up the plates five parts by weight of red lead and one part by weight of litharge (protoxid of lead) are mixed together for positive plates, and five parts by weight of litharge and one part by weight of red lead are mixed together for negative plates. Each mixture on being added to a solution of sulfate of zinc and bioxalate of potassium (salt of sorrel) is stirred up, so as to form a thick paste or pulp. It is sufficient to have from ten to thirty parts by weight of solution of sulfate of zinc for every one hundred parts by weight of oxid of lead. The said solution consists of forty parts of sulfate of zinc to every one hundred parts of water, and has, moreover, added to it, say, two parts by weight of bioxalate of potassium. The paste may be molded or spread over suitable grating or lattice work, or may be put into frames, or may be made into cakes of sufficient thickness and placed upon either clay or iron plates. The plates are then dried for a considerable space of time in a closed chamber at a temperature which may vary from 40° to 100° centigrade, and may conveniently rise to about 44° centigrade. After this, while still hot, the dried plates should immediately be placed in dilute acid, (preferably dilute nitric acid or sulfuric acid, or a mixture of both acids,) where they should be left for a period which may vary between five and forty minutes, whereupon they should be allowed to dry. In the course of such a treatment as this both the sulfate of zinc and the bioxalate of potassium will separate from the mass, which will become very porous and will harden to such a degree that it cannot break even when dropped on the floor. Its main constituent materials or ingredients will be peroxid of lead and spongy lead in such a shape that the period of "formation" will be very considerably shortened.

The proportions of the ingredients named are given above by way of example only, and as regards the bioxalate of potassium, the main object of which is to enhance the porosity of the plates, its employment is expedient, though not absolutely necessary.

I claim as my invention—

1. A process of making porous material for the plates of storage or secondary batteries, such process consisting in mixing or stirring together oxid of lead with sulfate of zinc in solution, so as to form a paste, then molding the paste, drying and then submitting to the action of dilute acid.

2. A process of making porous material for the plates of storage or secondary batteries, such process consisting in mixing or stirring together oxid of lead with sulfate of zinc in solution, so as to form a paste, then molding the paste, drying and then submitting to the action of dilute nitric acid.

3. A process of making porous material for the plates of storage or secondary batteries, such process consisting in mixing or stirring together oxid of lead with sulfate of zinc in solution, so as to form a paste, then molding the paste, drying and then submitting to the action of dilute mixture of nitric and sulfuric acid.

In witness whereof I have signed my name to this specification in the presence of two subscribing witnesses.

WILHELM PETSCHEL.

Witnesses:
W. HAUPT,
H. HASPER.